United States Patent [19]

Fujiwara

[11] 3,772,850

[45] Nov. 20, 1973

[54] WRAPPING APPARATUS FOR SEALING ARTICLES WITH THERMOPLASTIC RESIN FILMS

[76] Inventor: Wataru Fujiwara, 172 Kasahara-cho, Kasai City, Japan

[22] Filed: Apr. 4, 1972

[21] Appl. No.: 240,370

[52] U.S. Cl.................... 53/182, 53/373, 53/390, 83/104, 83/272, 83/564, 156/515, 156/583
[51] Int. Cl.............................................. B65b 9/12
[58] Field of Search.................... 83/78, 109, 564, 83/734, 650, 389, 597, 272, 104; 156/510, 583, 515; 53/390, 373, 182, 180

[56] References Cited
UNITED STATES PATENTS

| | | | |
|---|---|---|---|
| 3,574,039 | 4/1971 | Fehr et al. | 156/515 |
| 3,412,527 | 11/1968 | Aquarius et al. | 53/182 X |
| 2,996,866 | 8/1961 | Gilbert | 53/390 X |
| 2,826,025 | 3/1958 | Swartz | 53/180 |

Primary Examiner—Andrew R. Juhasz
Assistant Examiner—W. D. Bray
Attorney—Arthur Schwartz et al.

[57] ABSTRACT

A wrapping apparatus for sealing articles to be packed in a pair of thermoplastic resin films, the films being rolled on a pair of upper and lower rolls. The apparatus includes a cutter means for cutting the films and a heat-sealing means for thermally sealing the articles therein at the periphery of the cut films.

The apparatus automatically feeds the film off of the rolls for the next wrapping action, and restores the heat-sealing means to a disengaged position after the article has been sealed, thereby providing a continuous wrapping operation.

9 Claims, 9 Drawing Figures

WRAPPING APPARATUS FOR SEALING ARTICLES WITH THERMOPLASTIC RESIN FILMS

BACKGROUND AND OBJECTS

The present invention relates to an apparatus for wrapping a variety of processed foodstuffs and the like in thermoplastic resin films, and more particularly to an apparatus for sealing the articles within a pair of thermoplastic resin films.

Conventionally, it has been customary to employ a relatively large wrapping apparatus for wrapping in a pair of thermoplastic resin films. Such larger wrapping apparatus have an advantage that they can wrap a great number of articles in a single process; however, they have the following disadvantages: they are complicated, more expensive to manufacture and heavy in weight, thus being devoid of mobility making it difficult to readily change their place operation, and they consume a large area for installation. Therefore, practically, they are not adaptable for wrapping articles quickly such as behind the counter in retail shops.

One object of the present invention is to provide a compact wrapping apparatus for long service which is simple in structure, low in manufacturing cost and light in wieght, superior in mobility and readily installed in small spaces. It further has the advantage that it can seal one article after another by the repetition of a single hand operation with the result that it is employable for wrapping marketing articles behind the counter at a shopkeeper's convenience.

Another of the principal objects of the present invention is to provide such an apparatus for sealing articles that is light in weight, small in size and operable in small areas.

Another object of the invention is to provide a wrapping apparatus that is simple in structure and capable of wrapping articles with a single hand operation.

A further object of the invention is to provide a wrapping apparatus which can automatically supply a pair of films above and below the article at the same time, thereby continuously sealing articles effectively by repeated hand operations.

One of the other objects of the invention is to provide a wrapping apparatus which can be easily and exactly operated without fatigue, even with a hand operation.

A still further object of the invention is to provide a wrapping apparatus that can wrap articles of different shape and size, merely by changing attachments to conform with the shape and size thereof, and having a broad variety of uses and being easily serviced, etc.

BRIEF DESCRIPTION OF THE DRAWINGS

The foregoing and other objects, features and advantages of the invention will become apparent from the following detailed description and accompanying drawings wherein.

DETAILED DESCRIPTION OF THE INVENTION

Figure 1:
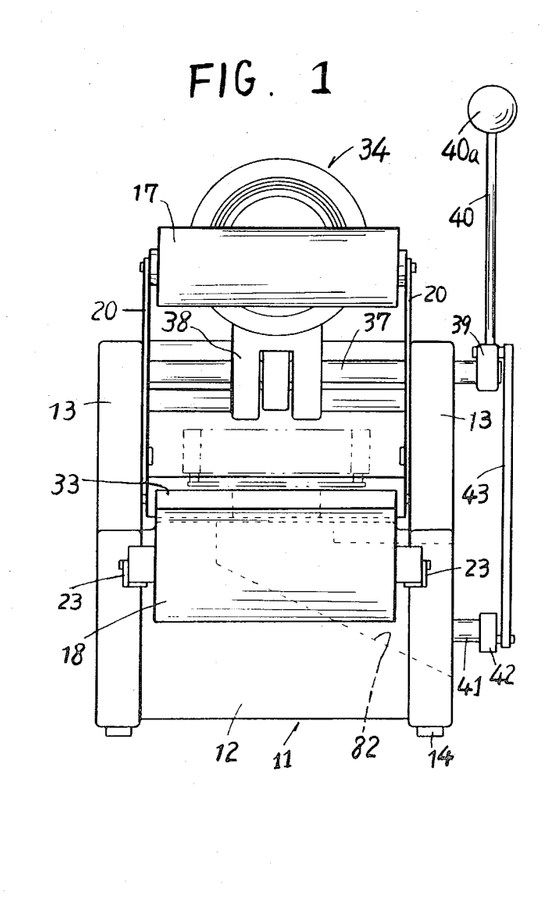
FIG. 1 is a front elevation of the invention.
Figure 2:
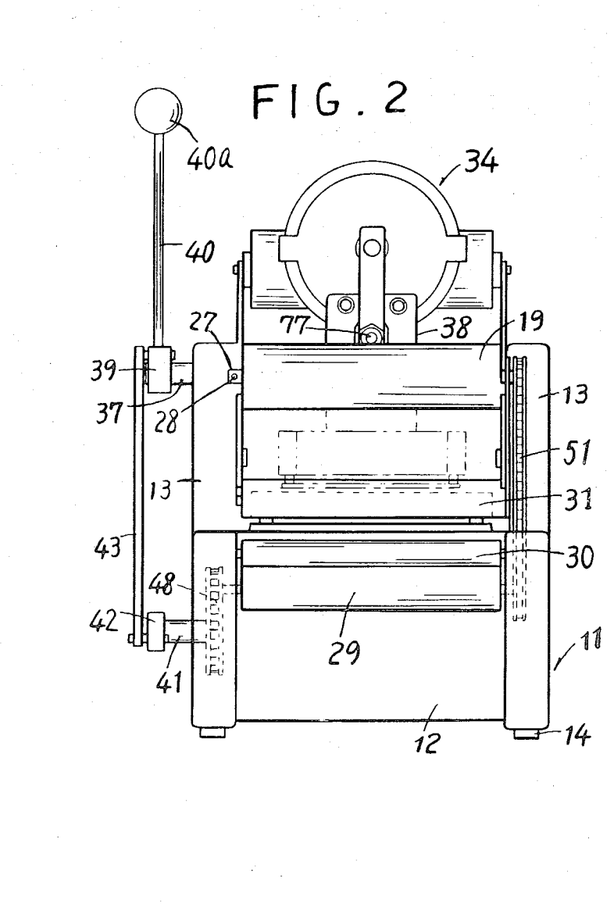
FIG. 2 is a rear elevation thereof.
Figure 3:
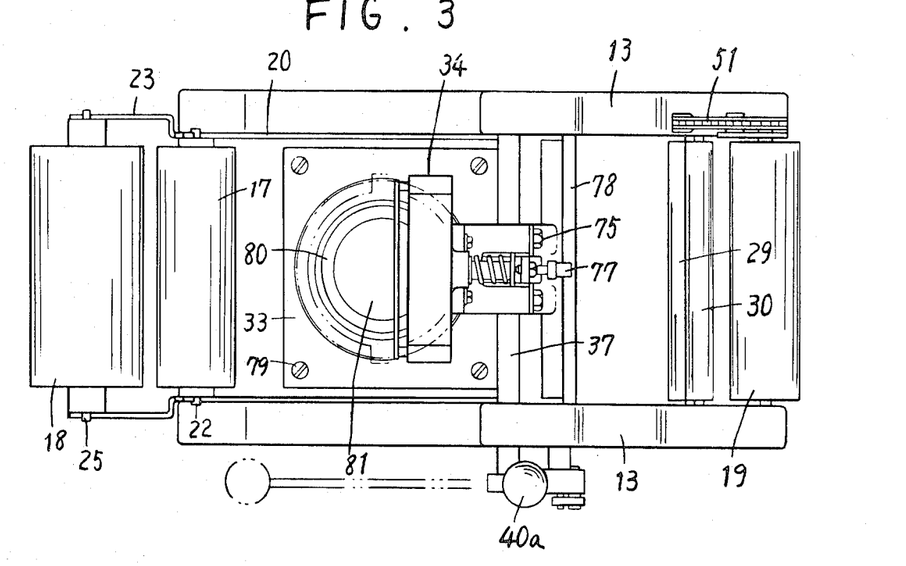
FIG. 3 is a top plan view thereof.
Figure 4:
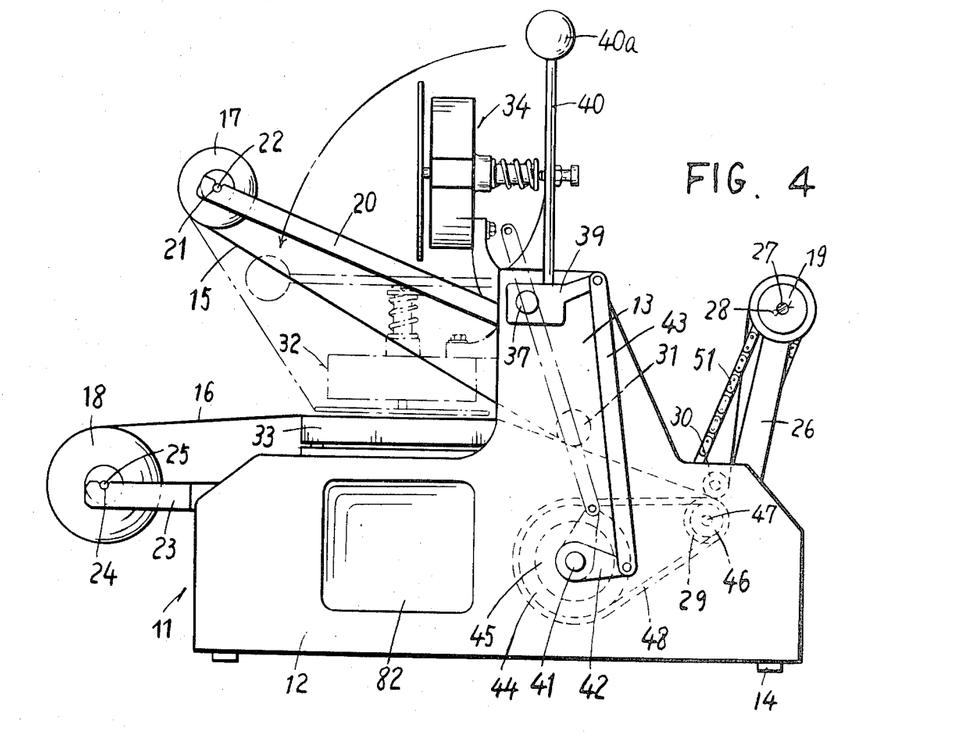
FIG. 4 is a side elevation thereof.
Figure 5:
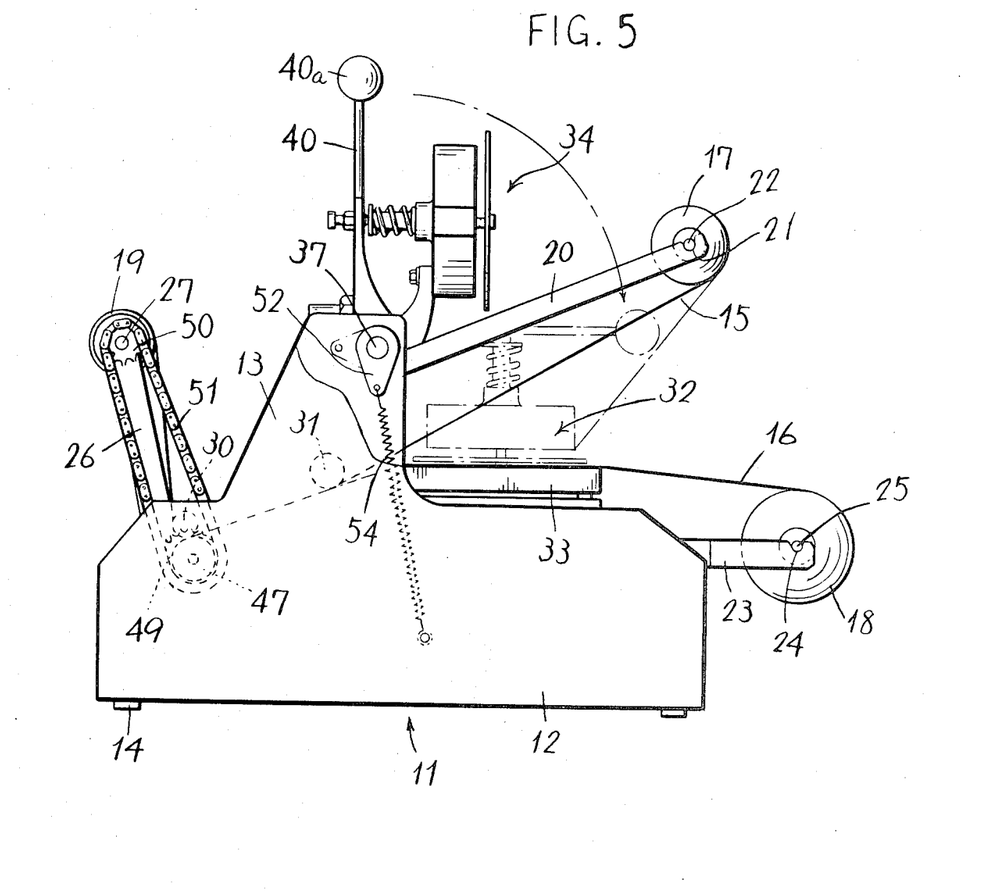
FIG. 5 is another side elevation opposite of FIG. 4.

Referring to FIG. 1, reference numeral 11 designates a base plate comprising a sole plate 12 and a pair of side walls 13 which are arranged symmetrically to form a channel therebetween. The sole plate 12 includes two pair of rubber legs 14 on the bottom thereof which are soft enough to be readily placed on a counter. A pair of thermoplastic resin films 15 and 16 as seen for example in FIG. 4 are disposed partially separated from each other, and one above the other. If desired, they may be printed with a selected design, trademark and/or name of the manufacturer of the article to be packed. Reference numeral 17 designates a roll for feeding the upper film 15 and numeral 18 designates a roll for feeding the lower film 16. On each feed roll 17, 18, the films 15, 16, respectively, are initially rolled. A roll 19 is provided on which the pair of films 15 and 16 are rolled together. A pair of roll supporting arms 20 are positioned symmetrically in an oblique upward direction from the two opposed side walls 13. They include a notch 21 on the outward ends thereof to support the ends of a roll supporting shaft 22 for supporting the feed roll 17. The notches 21 thereby detachably support the feed roll 17 on the roll supporting arms 20. A pair of roll supporting arms 23 are positioned symmetrically in a horizontal direction and include at their foremost ends a notch 24 whereby each end of a roll shaft 25 for supporting the feed roll 18 is held, thereby detachably supporting the feed roll 18. Accordingly, the feeding rolls 17 and 18 are disposed at upper and lower locations and are separated from each other thereby forming a film feed mechanism.

A roll supporting arm 26 is positioned over one end of the sole plate 12 to horizontally support a roll shaft 27.

The roll 19 is mounted on the roll shaft 27 in such a manner that it is insertible from the free end thereof and rotatable thereon. A pin 28 holds the roll 19 in position. The above elements comprise the film feed mechanism. Numeral 29 designates an intermediate roll over which is fed the films 15 and 16. The intermediate roll is horizontally pivoted between the walls 13 at the rear end of the sole plate 12. The intermediate roll 29 normally cooperates with a press roll 30. A guide roll 31 is used to guide each of the films 15 and 16 from the feed rolls 17 and 18 onto the intermediate roll 29.

As has been mentioned, the film feed mechanism and the film rolling mechanism are arranged respectively on the front and rear ends of the base plate 12 at a suitably spaced distance. The pair of upper and lower films 15 and 16 are fed respectively in synchronism from the pair of upper and lower film feed rolls 17 and 18 and overlap each other on the guide roll 31. They are rolled onto the roll 19 after passing between the intermediate roll 29 and the press roll 30. At the intermediate position of the film feed mechanism and the film rolling mechanism, an article supplying means 32 is provided for supplying an article G to be wrapped, in the triangularly shaped space formed. A receiving plate 33 for receiving the films 15 and 16 and the article G is provided on the sole plate 12 below the supplying means 32. A film heat-sealing device 34 if movably mounted over the article supplying means 32 as will be described hereinafter. The heat sealing device 34 has an annular cutter 35 and a heat-sealing device or disc 36 for pressing the films 15 and 16 against the receiving plate 33 around the article G, whereby the films can be cut and thermally sealed at the same time.

The device is so constructed that the film feed mechanism and the film rolling mechanism are spaced apart at the front and rear ends of the base plate 12, respectively. The article supplying device 32 is provided in the triangular space formed by the upper and lower films 15 and 16 at an intermediate position between the two mechanisms. The receiving plate 33 is mounted below the article supplying device 32 and the film heat-sealing device 34 is mounted thereover. The wrapping apparatus of the present invention makes it possible to position all of the required mechanisms on the base plate or main body 11, whereby it can be installed on a counter thereby making the best use of the available space in a compact, lightweight fashion.

A pivot member 37 is held horizontally between the side walls 13 to support the film heat-sealing device 34 by means of the pivoting mechanism 38 to be described hereinafter. The film heat-sealing device 34 is adapted to swing about the pivot 37. To one end of the pivot 37 is secured a handle holder 39 to which a handle 40 is fixedly mounted so that by grasping a handle grip 40a and rocking it in the up and down directions, the horizontal handle holder 39 swings the film heat-sealing device 34 up and down.

Figure 6:
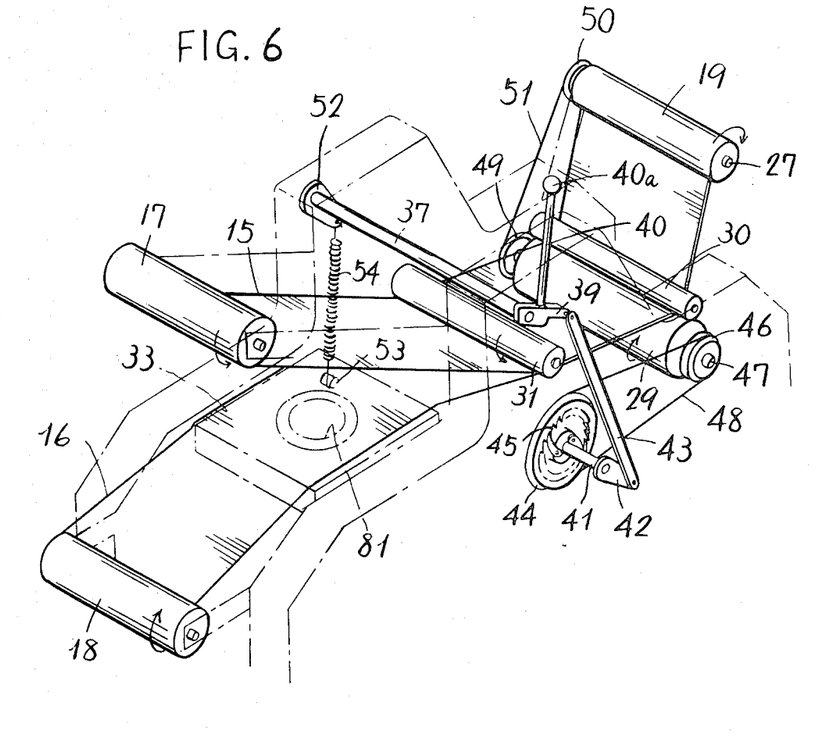
FIG. 6 is a perspective view showing how a pair of upper and lower films are supplied and rolled.

When the film heat-sealing device 34 is moved downward, the annular cutter 25 and the heat-sealing disc 36 press the upper and lower films 15 and 16 against the receiving plate 33 thereby cutting and sealing both films around the article G in the manner which will be described hereinafter. On the sole plate 12 is rotatably supported a shaft 41 as is shown in FIG. 6. An arm 42 is secured thereto and the handle holder 39 is connected so as to move therewith by means of a link 43.

A sprocket 44 is freely mounted on the shaft 41, and therebetween is mounted unidirectionally rotatable clutch means 45. To one end of a roll shaft 47 of the intermediate feed roll 29 is secured a sprocket 46. Between the sprockets 44 and 46 there is extended an endless chain 48. Likewise, between a sprocket 49 secured to one end of the roll shaft 47 and a sprocket 50 secured to another end of the roll 27, there is extended an endless chain 51. An arm 52 is secured to one end of the horizontal shaft 37. Between the arm 52 and a spring retainer 53 secured to the sole plate 12, there is extended a helical spring 54 to restore the horizontal shaft 37 to its original and normal position.

All of the above-mentioned members 41 to 54 constitute an automatic feed mechanism which drives the roll 19 by means of the swinging movement of handle 40 (the automatic feed mechanism being clearly illustrated in FIG. 6). In other words, the link 43 is lifted upward by the holder 30 when the handle 40 is swung downward to lower the film heat-sealing device 34 to the receiving plate 33. In this situation, the shaft 41 is rotated in one direction only by the arm 42, the direction being same as the direction the unidirectionally rotatable clutch means 44 slips so that the roll 19 is prevented from rotating when the sprocket 44 is not driven.

Furthermore, when the handle 40 is swung downward, the spring 54 is pulled upward by means of the arm 52 so that the handle 40 is induced to its upward position. Therefore, after the wrapping operation has been completed, the handle 40 is restored to its upward position by the dynamic stability of the spring 54, thereby raising the film heat-sealing device 34 to its original position, subsequently pulling down the raised link 43 to rotate the shaft 41 in the reverse direction through the arm 42. Then the unidirectionally rotatable clutch means 45 operates to rotate the sprocket 44 and the shaft 41 together in the same direction. In this situation, the rotating power of the sprocket 44 is transmitted to the roll shaft 47 through the endless chain 48 and the sprocket 46, thereby rotating the intermediate feed roll 29 in the film feeding direction. The rotating power is further transmitted to the roll 27 from the roll shaft 47 through the sprocket 49, endless chain 51 and sprocket 50 thereby rotating the roll 19 with the result that the upper and lower films 14 and 16 are pulled out by the two feed rolls 17 and 18 and are automatically rolled onto the roll 19 a given distance. Due to this automatic film rolling operation, the hole portions formed on the films 15 and 16 which are cut into a circular shape by means of the annular cutter 35 are transferred a distance rearward of the article supplying means 32. Supplying means 32 is supplied in turn with the succeeding portions of the upper and lower films 15 and 16 for the succeeding operation.

By the provision of the above-mentioned automatic drive mechanism which drives the roll 19 a given distance by the restoring movement of the handle 40, the film heat-sealing device is raised to its original position. Also, it is possible to automatically feed and roll the films thereby continuously sealing one article after another efficiently.

Figure 7:
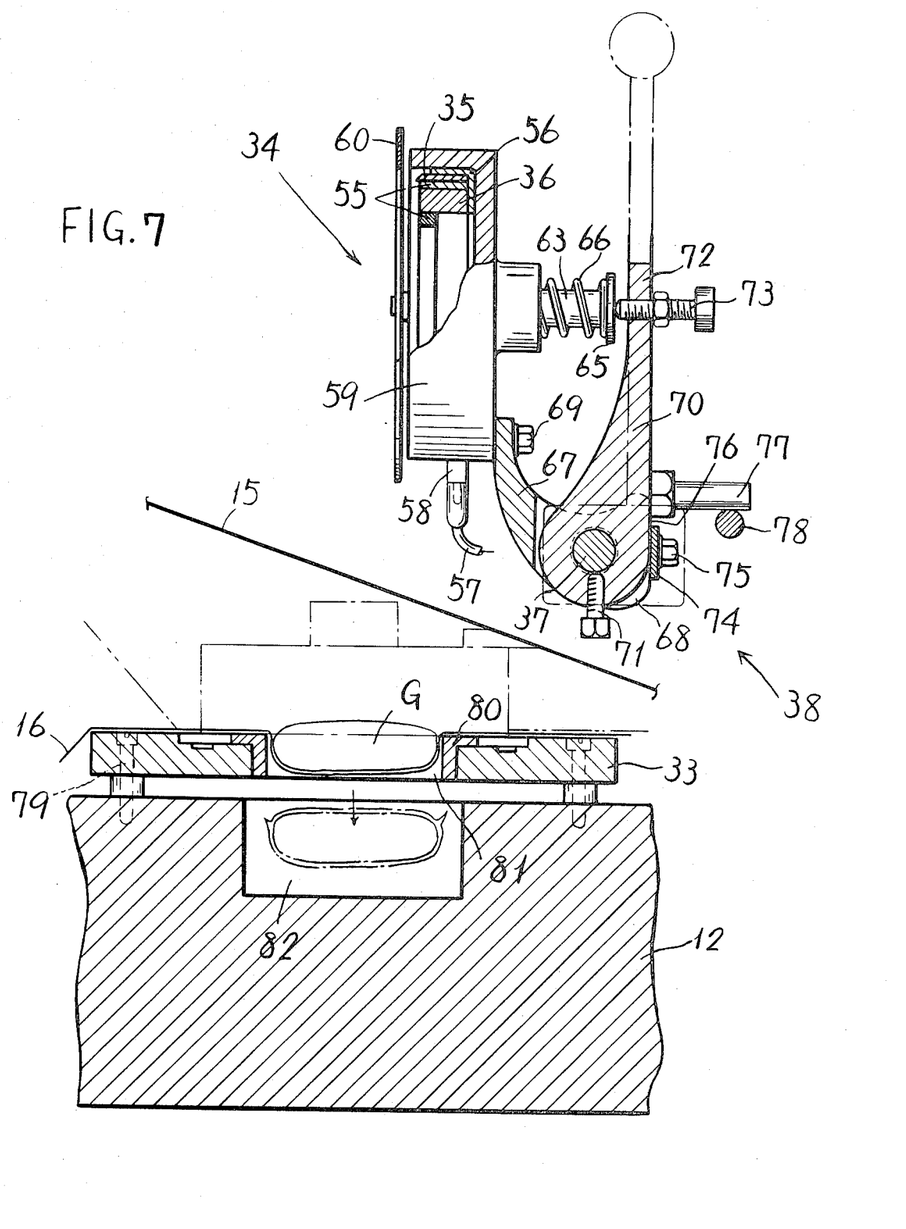
FIG. 7 is a vertical cross-section showing in an enlarged form, the principal elements of a heat-sealing disc, the pivotally supporting mechanism thereof and a base plate for receiving the disc.
Figure 8:
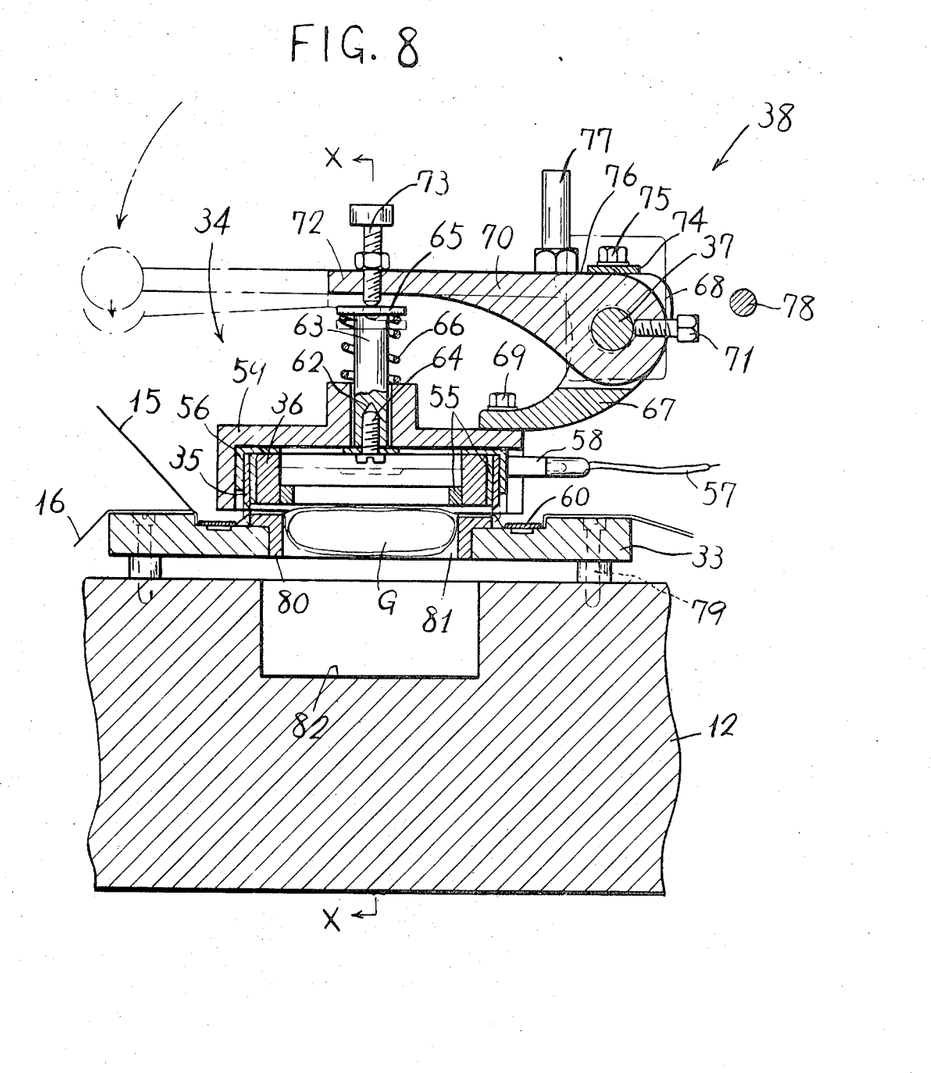
FIG. 8 is a vertical cross-section showing in an enlarged form, the state when the heat-sealing disc of FIG. 7 has been lowered to pack an article.
Figure 9:
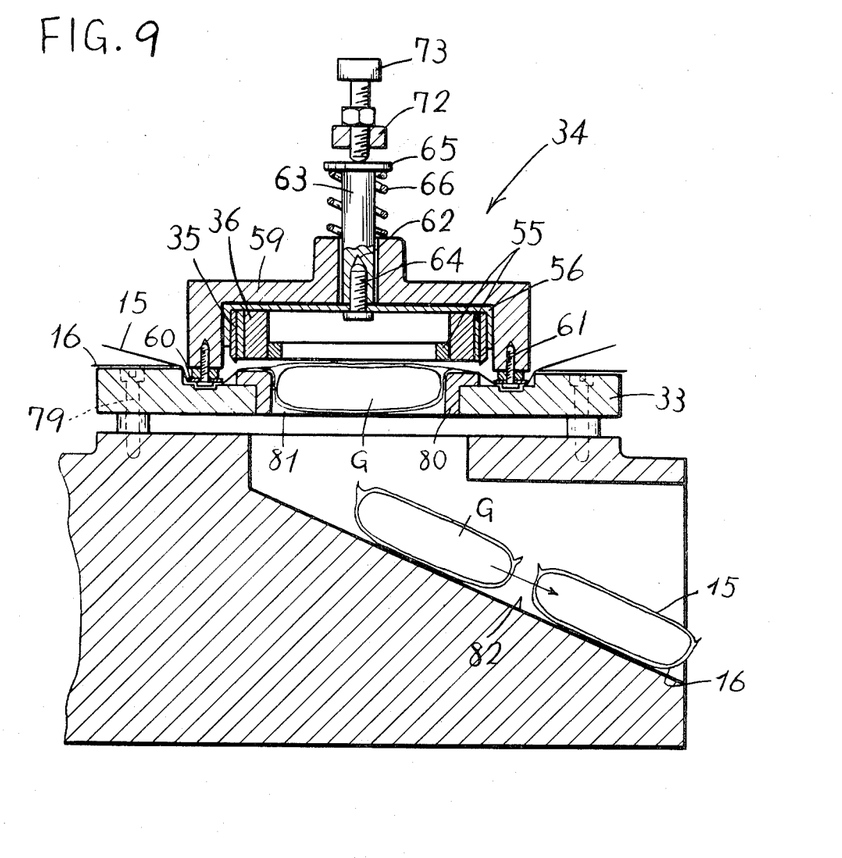
FIG. 9 is a vertical cross-section taken along the line X—X in FIG. 8.

Now referring to the construction of the above-mentioned film heat-sealing device 34 and other construction pertaining thereto with respect to FIGS. 7 to 9, the annular cutter 35 has the heat-sealing disc 36 provided internally thereof. Between the cutter 35 and disc 36, as well as on the inside of the disc 36, there are positioned thermal insulating rings 55 held together by means of a ring holder 56 provided with an insertible plug receptacle 58 connected to a cord 57 for supplying the electricity to the heat-sealing disc 36. The members supporting the annular cutter 35 and the heat-sealing disc 36 form an attachment to the film heat-sealing device 34. The ring holder 56 is externally held by a holder means 59, and a press disc 60 is attached to the lower surface of the holder means 59 by a plurality of screws 61. The press disc 60 has a larger inner diameter than that of the annular cutter 35. It is mounted on the holder means 59 and projects farther below heat-sealing disc 36 than does cutter 35. In the center of the holder means 59 is bored a hole 62 into which a holder pin 63 is slidably inserted in a fixed axial direction. To one end of this holder pin 53 a ring holder 56 is detachably mounted by means of a single set screw 64. To the other end of the holder pin 63 is integrally mounted a flange 65. A helical spring 66 which is suitably pre-compressed, is provided around the holder pin 63 between flange 65 and the holder 59 whereby the holder pin 63 is normally pressed in the direction away from the holder means 59 to press the ring holder 59 in the most recessed position of the holder means 59.

The mechanism for pivotally supporting the film heat-sealing device 34 on the horizontal shaft 37 is a supporting arm 67 having a pair of opposed arm members 68 which rotatably support the film heat-sealing device 34 on the horizontal shaft 37. A press arm 70 is pivotally supported between the pair of arm members 68 on the horizontal shaft 37 and secured thereto by means of screw 71. An end 72 is connected by an adjustably threaded press screw 73 in a manner such that the foremost end of the latter screw is in abutment against the edge of the flange 65 of holder pin 63. The press arm 70 has its one end 72 extended toward the holder pin 63. A stop plate 74 has its both ends respectively secured to each foremost end of the arm members 67 by means of screws 75 and is supported between the arm members 67 until it abuts against the outside 76 of the press arm 70. A stop means 77 is projected to the outside 76, and a stop shaft 78 supported between walls 13 abuts the stop means 77.

The receiving plate 33 has its four corners detachably mounted to the sole plate 12 by means of screws 79 and is provided with a rubber ring 80 opposite the heat-sealing disc 36 and arranged to be contacted by the annular cutter 35. Ring 80 is preferably composed of a thermostable material such as a silicone rubber. The inside of rubber ring 80 is a discharge opening 81 through which a wrapped article drops. The discharge opening 81 passes through the sole plate 12 and is interconnected with the upper end of an inclined tunnel 82 open at one end thereof so that the wrapped articles are discharged through the inclined tunnel 82.

OPERATION

The wrapping apparatus is constructed so that the film heat-sealing device 34 moves up and down, thereby sealing an article G which is fed between the upper and lower films 15 and 16. It is to be understood that when the handle 40 remains lifted by the spring 54, the film heat-sealing device 34 stays in its upper position since the stop means 77 is in contact with the stop shaft 78. In this situation, the upper and lower films 15 and 16, fed by the feed rolls 17 and 18 respectively, overlap each other on the guide roll 31 in a manner such that the lower film 16 below the article supplying device 32 is overlapped on the receiving plate to close the discharging opening 81. The upper film 16 extends above the feed roll 17, thereby forming a triangular space between these films 15 and 16. Thus, an article G to be wrapped is placed manually on the upper surface of the discharging opening 81 over the lower film 16. By this time, the heat-sealing disc 36 has been suitably heated by the electricity supplied through the cord 57. Then the handle 40 is moved downward to rotate the horizontal shaft 37, whereby both the pivotally supporting arm 67 and the press arm 70 are rocked downward to lower the holder means 59, the annular cutter 35 and the heat-sealing disc 36 together in a swinging movement. In this position, the annular press plate 60 lowers ahead of the annular cutter 35 and the heat-sealing disc 36. Therefore, the upper film 15 is pressed onto the receiving plate 33 around the article G by means of the annular press plate 60, thereby surrounding the surface of the article. The pivotally supporting arm 67 is lowered to the lowest level until the handle 40 ends its first lowering movement. Thereafter, the handle 40 continues its second lowering movement, subsequently rotating the horizontal shaft 37. In this situation, the pressure arm 70 moves off the stop plate 74 while swinging downward, the pressure screw 73 presses the holder pin 63 downward to compress the spring 66 so that both the annular cutter 35 and the heat-sealing disc 36 are forcibly pushed downward against the spring 66. Then the upper and lower films 15 and 16 are cut around the article G by the annular cutter 35 and thermally sealed on the rubber ring 80 by the heat-sealing disc 36. In this situation, the handle 40 has reached its lowest level and the article G is sealed between the circular portions of the films 15 and 16.

As has been mentioned, the annular cutter 35 and the heat-sealing disc 36 are moved down to a considerably lower level at the first descending stage of the handle 40. At the succeeding descending stage, the handle 40 compresses the spring 66, thereby lowering the annular cutter 35 and the heat-sealing disc 36. Thus, the impact to the operator's hand from the handle 40 is considerably absorbed when the heat-sealing disc 36 contacts the rubber ring 80 and the handle 40 reaches its lowest level, thereby making it easy to pack one article G after another by the handle operation with the minimum of fatigue caused by the impact.

Due to this operational process, the films 15 and 16 are first pressed on the receiving plate 33 by means of the film press disc 60 which moves down in advance of the annular cutter 35 and the heat-sealing disc 36. Thereafter, the films are thermally cut and sealed around the article G. It is quite possible with the instant invention to eliminate such difficulties as when the upper film 15 is unexpectedly brought into contact with cutter 35 and disc 36, thereby cutting, partially melting, or making holes therein. Also, the invention will eliminate the problem of the films slipping out of place and not being thermally sealed in the correct position. The packed articles G stay in the discharge opening 81 until pushed out by the following articles and are discharged downward through the inclined tunnel 82. If the films 15 and 16 are made of thermoplastic resin material, they easily conform to the surface of the article G under the thermal sealing treatment whereby the articles G thus packed drop down by their dead load.

Since the arrangement is such that each of packed articles G is pushed down in turn along the inner periphery of the discharge opening 81, the upper and lower films 15 and 16 are compressed and sealed at the outer periphery of the article G so that it is possible not only to effect the heat and close wrapping operation of the article G without spoiling its good appearance, but also to enhance the wrapping efficency by releasing an operator from the labor of manually moving one article after another from the discharge opening 81. The ring holder 56 integrally provided with the annular cutter 35 and the heat-sealing disc 36 is removably mounted on holder pin 63 by means of screws 64. Likewise, the receiving plate 33 is also removably mounted on the sole plate 12 by means of four screws 79. Thus, annular cutter 35, heat-sealing disc 36 and recieivng plate 33 are easily replaceable. Accordingly, a group of articles G to be wrapped, in whatever shape and size, can be sealed with uniformity merely by replacing these annular cutter 35, heat-sealing disc 36 and receiving plate 33 with those having the shape and size that exactly meets the articles G thereby preventing waste of film portions and simplifying the replacing operation of said members.

According to the wrapping apparatus of this invention, it is possible to continuously wrap any articles of a uniform shape and size, such as, for example, processed foodstuffs like cakes, pies, breads, meat, sausages, cheese or sundries like soap, toys, toilet articles, plastics and the like which are uniform in shape and size.

While one embodiment of the invention has been described, it will be understood that it is capable of many further modifications and this application is intended to cover any variations, uses, or adaptations of the invention following in general, the principle of the invention and including such departures from the present disclosure as come within knowledge or customary practice in the art to which the invention pertains, and as may be applied to the essential features hereinbefore set forth and fall within the scope of the invention or the limits of the appended claims.

What is claimed:

1. A wrapping apparatus comprising:
   a. an upper roll having an upper film thereon,
   b. a lower roll having a lower film thereon,
   c. a take-up roll,
   d. means for moving the upper and lower films from said upper and lower rolls past a wrapping space onto said take-up roll,
   e. a wrapping mechanism at the wrapping space including an integral heat-sealing and cutting means movable in and out of the wrapping space,
   f. a receiving plate surrounding the wrapping space and cooperating with said heat-sealing and cutting means,
   g. a pivotally supported mechanism for swinging said heat-sealing and cutting means,
   h. said pivotally supported means including a press plate for pressing the upper and lower films in advance of said heat-sealing and cutting means,
   i. means for maintaining said heat-sealing and cutting means a distance from the films when said press plate first contacts the films,
   j. means for lowering said heat-sealing and cutting means to contact said films within the peripheral edge of the films during a final portion of the swinging movement,
   whereby said cutting means presses and cuts the films on the receiving plate at the periphery of the article, and said heat-sealing means thermally seals the cut films together, both cutting and heat-sealing taking place within the peripheral edges of the films so that the uncut films can proceed to the take-up roll.

2. A wrapping apparatus as defined in claim 1 including a press plate for pressing the upper and lower films in advance of said heat-sealing and cutting means, means for maintaining said heat-sealing and cutting means a distance from the films when said press plate first contacts the films, and means for lowering said heat-sealing and cutting means to contact said films during a final portion of the swinging movement.

3. A wrapping apparatus as defined in claim 2 including a spring means on said pivotally supported mechanism for maintaining said heat-sealing and cutting means a distance from the films after said press plate first contacts the films and before the final portion of the swinging movement.

4. A wrapping apparatus as defined in claim 1 including a discharge means positioned below the wrapping space.

5. A wrapping apparatus as defined in claim 5 wherein said discharge means includes an opening in said wrapping space and an inclined tunnel positioned therebelow.

6. A wrapping apparatus as defined in claim 1 wherein said heat-sealing and cutting means is annular.

7. A wrapping apparatus as defined in claim 1 wherein said cutting and heat-sealing means and said receiving plate are easily removable.

8. A wrapping apparatus comprising:
   a. an upper roll having an upper film thereon,
   b. a lower roll having a lower film thereon,
   c. a take-up roll,
   d. means for moving the upper and lower films from said upper and lower rolls past a wrapping space onto said take-up roll,
   e. a wrapping mechanism at the wrapping space including an integral heat-sealing and cutting means movable in and out of the wrapping space,
   f. a receiving plate surrounding the wrapping space and cooperating with said heat-sealing and cutting means,
   g. a pivotally supported mechanism for swinging said heat-sealing and cutting means,
   h. hand-operated means for effecting the swinging movement, whereby said cutting means presses and cuts the films on the receiving plate at the periphery of the article and said heat-sealing means thermally seals the cut films together in one hand operation, and
   i. means for automatically feeding the films a given distance to accommodate a new article when said hand-operated means is returned to its initial position.

9. A wrapping apparatus as defined in claim 8 wherein said automatic feeding means includes a handle, a linkage connected to said handle, said linkage being connected to a unidirectional clutch mechanism said clutch being operatively connected to said take-up roll whereby operation of said handle will effect operation of said take-up roll.

* * * * *